US012678886B2

(12) United States Patent　　(10) Patent No.:　US 12,678,886 B2
Furuno et al.　　　　　　　　　　(45) Date of Patent:　　　Jul. 14, 2026

(54) WELDING GUN

(71) Applicant: HONDA MOTOR CO., LTD., Tokyo (JP)

(72) Inventors: Takuya Furuno, Tokyo (JP); Hiroshi Miwa, Tokyo (JP); Yohei Teragaito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 677 days.

(21) Appl. No.: 18/037,335

(22) PCT Filed: Nov. 20, 2020

(86) PCT No.: PCT/JP2020/043480
§ 371 (c)(1),
(2) Date: May 17, 2023

(87) PCT Pub. No.: WO2022/107332
PCT Pub. Date: May 27, 2022

(65) Prior Publication Data
US 2023/0405705 A1　　　Dec. 21, 2023

(51) Int. Cl.
*B23K 11/31*　　　　(2006.01)
(52) U.S. Cl.
CPC .................................. *B23K 11/314* (2013.01)
(58) Field of Classification Search
CPC .... B23K 26/703; B23K 26/082; B23K 26/32; B23K 26/24; B23K 26/28; B23K 26/22;
(Continued)

(56) References Cited

U.S. PATENT DOCUMENTS 4,531,041 A * 7/1985 Larsson ............... B23K 11/314
　　　　　　　　　　　　　　　　　　　　219/89
5,128,510 A 　 7/1992 De Bruyn et al.
(Continued)

FOREIGN PATENT DOCUMENTS

CN 　 101230874 　 7/2008
CN 　 106457451 　 2/2017
(Continued)

OTHER PUBLICATIONS

Chinese Office Action and Search Report for Chinese Patent Application No. 202080107352.0 dated Oct. 17, 2023.
(Continued)

*Primary Examiner* — Phuong T Nguyen
(74) *Attorney, Agent, or Firm* — Amin, Turocy & Watson, LLP

(57) ABSTRACT

A holding part of a welding gun holds a held part that is provided to an arm having resistance welding electrodes. A first facing part and second facing part of the holding part face each other with the held part therebetween, so as to form a layered part. A connecting part fixes the relative positions of the first facing part and the second facing part. A collar is inserted into a through hole of the first facing part so as to be movable in the layering direction. When a pressing mechanism presses the second facing part, the held part, and the collar in the layering direction, the held part is sandwiched between the second facing part and the collar.

4 Claims, 6 Drawing Sheets

(58) Field of Classification Search
    CPC ............ B23K 26/0622; B23K 2101/18; B23K
                    2101/006; B23K 26/323; B23K 26/044;
                    B23K 2203/04; B23K 26/26; B23K
                    26/244; B23K 26/14; B23K 31/125;
                    B23K 26/20; B23K 26/0066; H05H 1/36
    USPC .............. 219/116, 119, 136, 121.48, 121.63,
                                                    219/121.64
    See application file for complete search history.

(56)                 References Cited

U.S. PATENT DOCUMENTS

2008/0240845 A1    10/2008  Drelon et al.
2017/0036296 A1*    2/2017  Fukui .................. B23K 11/315

FOREIGN PATENT DOCUMENTS

CN         108071648        5/2018
CN         111609142        9/2020

| JP | 62-102020 | 6/1987 |
| JP | 02-133276 | 11/1990 |
| JP | 04-266486 | 9/1992 |
| JP | 05-138365 | 6/1993 |
| JP | 06-018462 | 3/1994 |
| JP | 11-090645 | 4/1999 |
| JP | 11-245051 | 9/1999 |
| JP | 2004-314131 | 11/2004 |
| JP | 2009-255108 | 11/2009 |
| JP | 3205788 | 8/2016 |

OTHER PUBLICATIONS

International Search Report and Written Opinion for International
Application No. PCT/JP2020/043480 mailed on Feb. 9, 2021, 10
pages.
Chinese Office Action and Search Report for Chinese Patent Appli-
cation No. 202080107352.0 dated Mar. 6, 2024.

* cited by examiner

F I G. 1
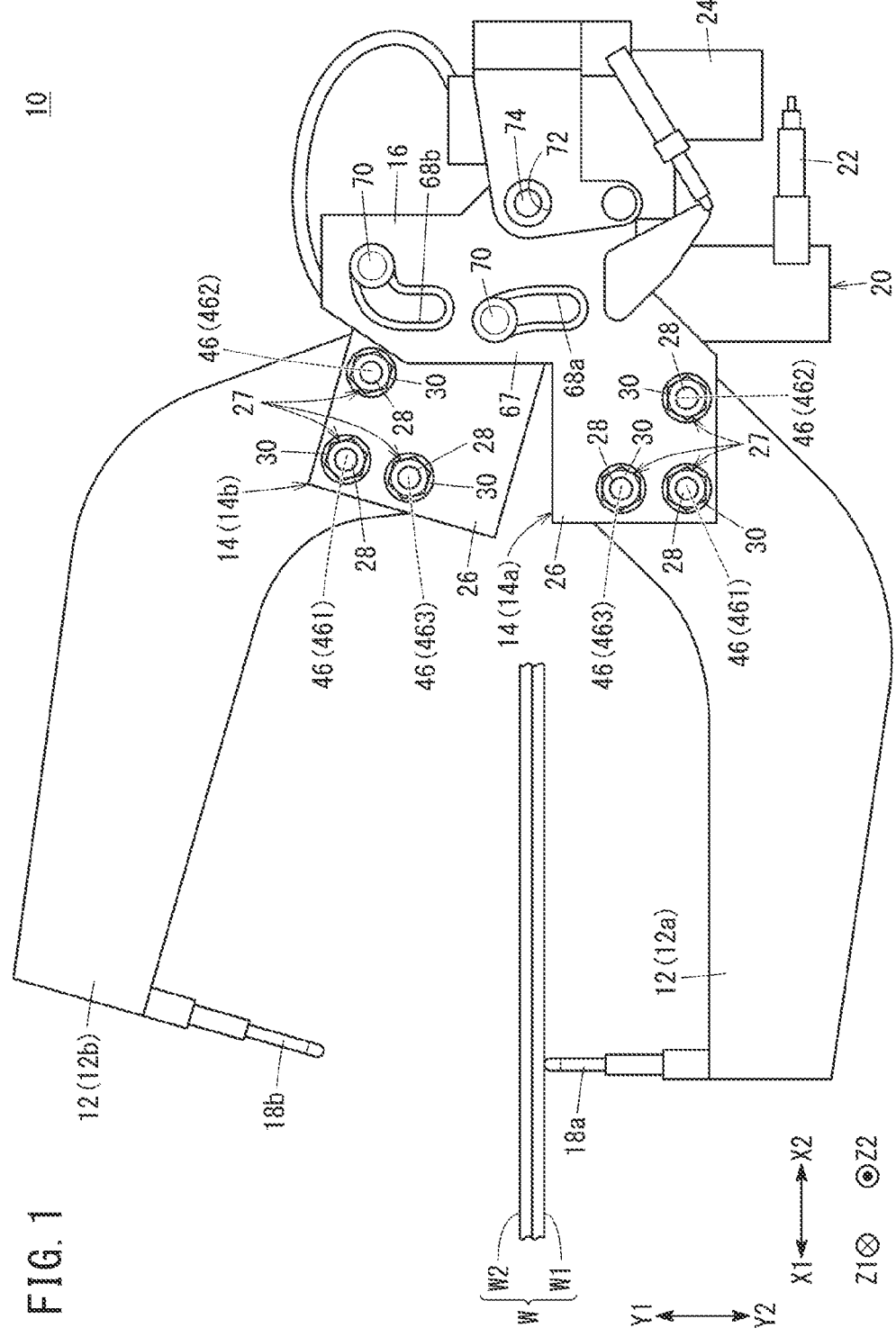

WELDING GUN

TECHNICAL FIELD

The present invention relates to a welding gun including a holding portion that holds a held portion provided for an arm including a resistance welding electrode.

BACKGROUND ART

There is known a welding gun including a pair of holding portions that respectively hold the held portions provided in a pair of arms including resistance welding electrodes. The welding gun is configured to be able to move the pair of arms, in each of which the held portion is held by the holding portion, away from or close to each other (open and close). As a result, the resistance welding can be performed by sandwiching the welding portion of a workpiece between the resistance welding electrodes of the pair of arms.

As the holding portion of the welding gun, for example, a structure described in JP H04-266486 A can be employed. Specifically, the holding portion includes a support member and a pin. The support member includes a pair of facing portions and a connection portion. The pair of facing portions are disposed to face each other, and sandwich the held portion of the arm on the distal end side thereof. The connection portion fixes the relative position of the pair of facing portions by connecting the proximal end sides of the pair of facing portions.

The pin is inserted into a through hole that integrally penetrates the pair of facing portions sandwiching the held portion, and applies a force in a direction in which the pair of facing portions approach each other. That is, the held portion is held by the holding portion by the pair of facing portions sandwiching and holding the held portion via the pin.

SUMMARY OF THE INVENTION

In this type of welding gun, it is preferable to maintain the welding gun in a state that the holding portion is firmly held by the held portion even when the arm is repeatedly opened and closed. However, in the above-described holding portion, when the held portion is sandwiched and held between the pair of facing portions, a force in a direction in which the pair of facing portions approach each other is applied to the pin side (distal end side) of the pair of facing portions while the connection portion side (proximal end side) of the pair of facing portions is maintained at a constant facing distance. In this case, the pressing force that can be applied to the held portion tends to be small on the connection portion side of the facing portions. That is, it is difficult to bring the surfaces of the facing portions across from the held portion and the held portion into parallel contact with each other to generate a frictional force therebetween. Accordingly, there is a concern that the holding force by the holding portion cannot be sufficiently increased.

In addition, in the pair of facing portions described above, when the arm is sandwiched and held, stress is likely to occur between the connection portion side maintained at a constant facing distance and the pin side to which a force in a direction in which the facing portions are brought closer to each other is applied. Due to this stress, there is a concern that the durability of the holding portion may decrease.

The present invention has been devised taking into consideration the aforementioned problems, and has the object of providing a welding gun that is capable of firmly fixing a held portion of an arm to a holding portion and excellent in durability of the holding portion.

According to an aspect or the present invention, there is provided a welding gun including a holding portion configured to hold a held portion provided in an arm including a resistance welding electrode, wherein the holding portion includes a first facing portion and a second facing portion configured to face each other with the held portion interposed therebetween to form a layered portion together with the held portion, a connection portion configured to fix a relative position of the first facing portion and the second facing portion in order that a distance between inner side surfaces of the first facing portion and the second facing portion is equal to or greater than a thickness of the held portion, the inner side surfaces each being across from the held portion, a through hole penetrating through the layered portion in a layer direction, a hollow collar provided with an insertion hole, and configured to be inserted into the through hole of the first facing portion movably in the layer direction, the insertion hole being disposed coaxially with an axial direction of the through hole of the first facing portion, and a tightening mechanism inserted into the through hole of the second facing portion, the through hole of the held portion, and the insertion hole of the collar in order to tighten the second facing portion, the held portion, and the collar in the layer direction, and wherein the held portion is sandwiched and held between the second facing portion and the collar by tightening of the tightening mechanism, and the held portion is pressed toward the inner side surface of the second facing portion.

In the holding portion of the welding gun, the held portion of the arm is sandwiched and held between the collar that is movable in the through hole of the first facing portion in the axial direction thereof (the layer direction of the layered portion) and the inner side surface of the second facing portion, by the tightening of the tightening mechanism. That is, the held portion is pressed in the layer direction toward the inner side surface of the second facing portion via the collar. For this reason, the inner side surface of the second facing portion and the held portion of the arm can be brought into contact with each other substantially in parallel to each other, so as to generate a satisfactory frictional force therebetween. As a result, it is possible to increase the holding force of the held portion by the holding portion.

In addition, even when the tightening is performed by the tightening mechanism as described above, it is possible to prevent a force in a direction in which the first facing portion and the second facing portion approach each other from being applied to the first facing portion and the second facing portion. For this reason, it is possible to suppress generation of stress between a part of the connection portion sides of the first facing portion and the second facing portion and a part of other portions. As a result, the durability of the holding portion can be improved.

As described above, according to the welding gun, the held portion of the arm can be firmly fixed to the holding portion, and the durability of the holding portion can be improved.

BRIEF DESCRIPTION OF DRAWINGS

FIG. 1 is a side view of a main part of a welding gun at a time that according to an embodiment of the present invention in an open state;

DETAILED DESCRIPTION OF THE INVENTION

Figure 2:
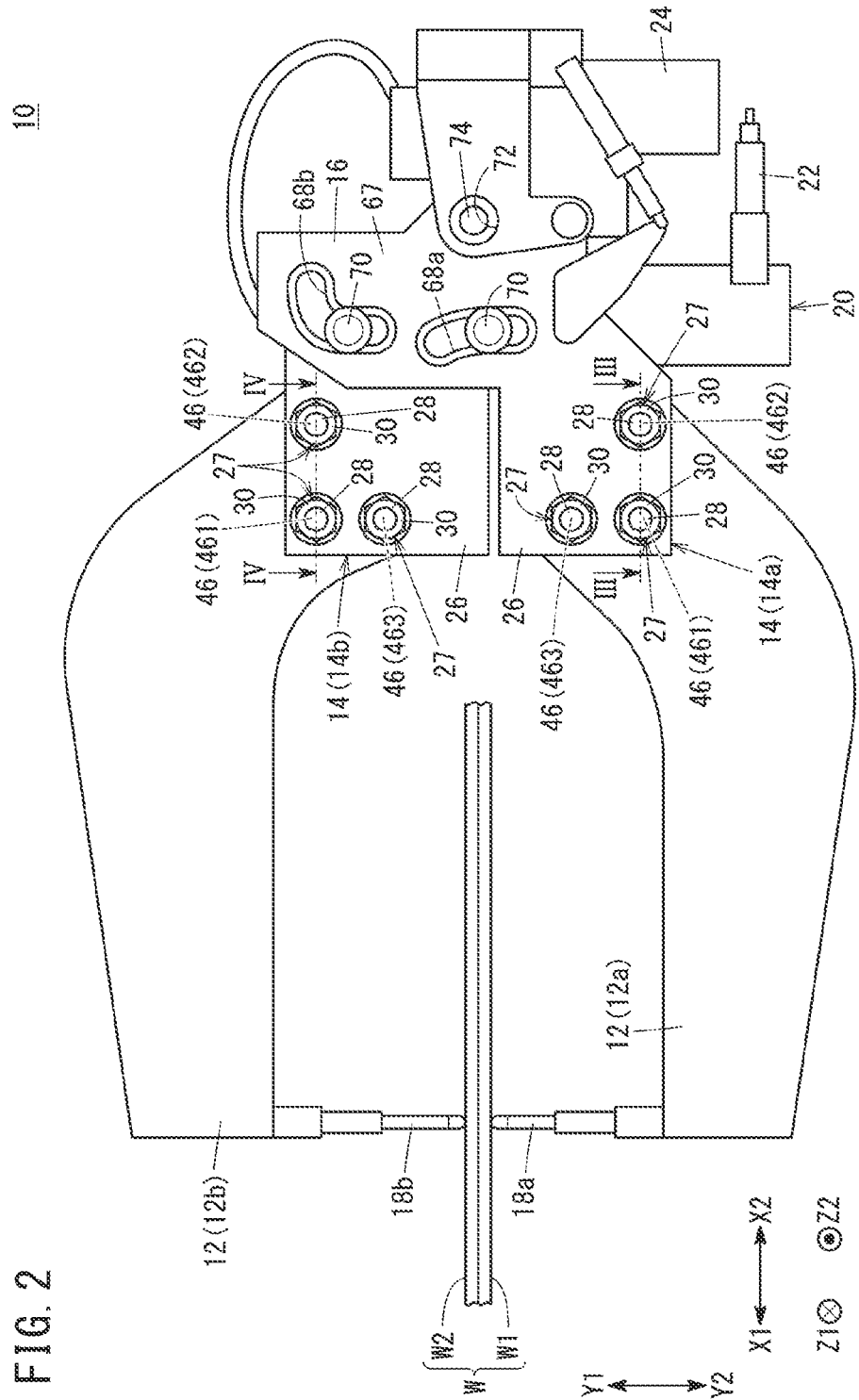
FIG. 2 is a side view of a main part of the welding gun of FIG. 1 in a closed state.

A preferred embodiment of a welding gun according to the present invention will be described in detail with reference to the accompanying drawings. A welding gun 10 according to the present embodiment of FIG. 1 includes a fixed side holding portion 14a that detachably holds a fixed arm 12a, a movable side holding portion 14b that detachably holds a movable arm 12b, and a mounting portion 16. The welding gun 10 is mounted to a distal end arm of a robot (not shown) via the mounting portion 16. Hereinafter, for example, in the case where the fixed arm 12a and the movable arm 12b are not particularly distinguished from each other, the fixed arm and the movable arm are collectively referred to as "arms 12" simply. In addition, for example, in the case where the fixed side holding portion 14a and the movable side holding portion 14b are not particularly distinguished from each other, the fixed side holding portion and the movable side holding portion are collectively referred to as "holding portions 14" simply.

Resistance welding electrodes 18a and 18b are provided on the respective distal end sides of the arms 12. Held portions 19 (FIG. 3) are provided on the respective proximal end sides of the arms 12, as portions held by the holding portions 14. In the following description, for convenience of description concerning the welding gun 10, an arrow X1 side in FIGS. 1 to 6 is referred to as a distal end side or a front side, an arrow X2 side is referred to as a proximal end side or a rear side, an arrow Y1 side is referred to as an upper side, and an arrow Y2 side is referred to as a lower side.

The robot is a moving unit that moves (conveys) the welding gun 10 to a predetermined welding work place. When the distal end arm of the robot performs an appropriate rotation operation or the like, the welding gun 10 moves to a position where a workpiece W can be sandwiched between the resistance welding electrodes 18a and 18b. The workpiece W is formed, for example, by laminating workpieces W1 and W2, and has a portion at which resistance welding is performed by the welding gun 10.

A swing unit 20 is arranged on the lower side of the fixed side holding portion 14a of the welding gun 10. The swing unit 20 includes a rod, a servomotor, and a ball screw (none of which are shown). The rod extends in the vertical direction (directions of arrows Y1 and Y2) in FIG. 1, passes through the inside of the fixed side holding portion 14a, and engages with the movable side holding portion 14b. A rotational motion of the servo motor is converted into a reciprocating motion (vertical motion) in an axial direction of the rod via the ball screw. With the reciprocating movement of the rod, the movable side holding portion 14b swings and the movable arm 12b held by the movable side holding portion 14b swings. As a result, the movable arm 12b can be separated from the fixed arm 12a held by the fixed side holding portion 14a as shown in FIG. 1 or can approach the fixed arm as shown in FIG. 2 (i.e., arms can open and close).

An encoder 22 and a transformer 24 are provided in the vicinity of the swing unit 20. The encoder 22 detects a rotation angle of the servo motor. The transformer 24 supplies a welding current between the resistance welding electrodes 18a and 18b provided at the distal ends of the fixed arm 12a and the movable arm 12b.

Figure 3:
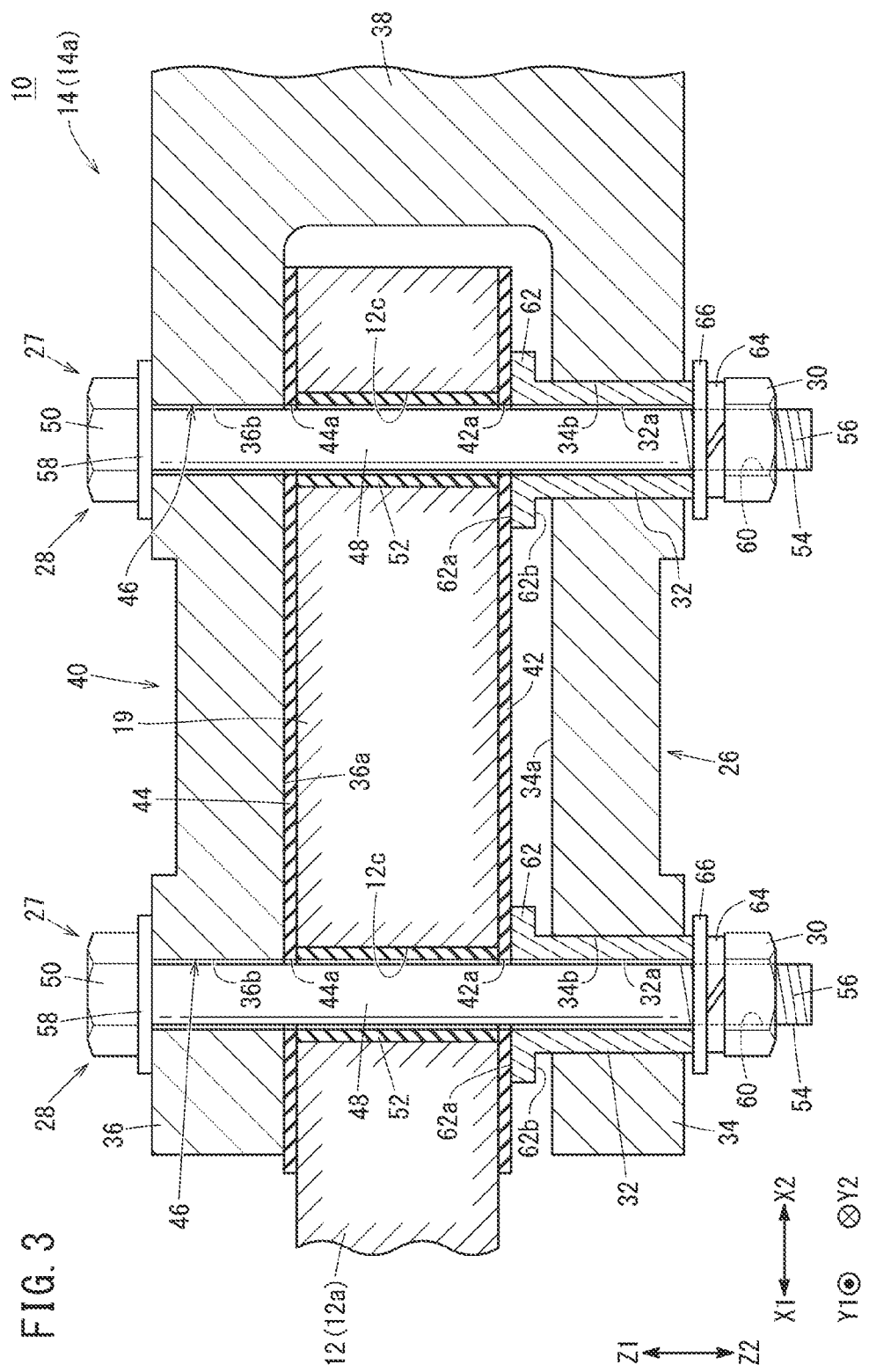
FIG. 3 is a cross-sectional view of the welding gun of FIG. 2 taken along line III-III.

Hereinafter, the holding portions 14 in a state of holding the held portion 19 of the arm 12 will be specifically described. As shown in FIGS. 1 to 3, the fixed side holding portion 14a has a holding portion main body 26 and tightening mechanisms 27. In the present embodiment, as shown in FIGS. 1 and 2, the holding portion main body 26 of the fixed side holding portion 14a is provided integrally with the mounting portion 16 at a lower portion of the distal end side of the mounting portion 16.

As shown in FIG. 3, the holding portion main body 26 includes a first facing portion 34, a second facing portion 36, and a connection portion 38. In the present embodiment, the holding portion main body 26 is integrally configured from one member, but may be configured by integrating separate members. The first facing portion 34 and the second facing portion 36 face each other with the held portion 19 of the fixed arm 12a interposed therebetween, thereby forming a layered portion 40 together with the held portion 19 of the fixed arm 12a. That is, in the layered portion 40, an inner side surface 34a of the first facing portion 34 and an inner side surface 36a of the second facing portion 36 are across from the held portion 19 of the fixed arm 12a.

The layered portion 40 further includes insulating plates 42 and 44. The insulating plate 42 is interposed between the inner side surface 34a of the first facing portion 34 and the held portion 19 of the fixed arm 12a. The insulating plate 44 is interposed between the held portion 19 of the fixed arm 12a and the inner side surface 36a of the second facing portion 36. Each of the first facing portion 34 and the second facing portion 36 is electrically insulated from the fixed arm 12a by the insulating plates 42 and 44.

The connection portion 38 connects proximal end sides of the first facing portion 34 and the second facing portion 36 to each other. As a result, the relative position of the first facing portion 34 and the second facing portion 36 is fixed in order that a distance between the inner side surface 34a of the first facing portion 34 and the inner side surface 36a of the second facing portion 36 is greater than or equal to a thickness of the held portion 19 of the fixed arm 12a.

Through holes 46 are formed in the layered portion 40 so as to penetrate through the layered portion 40 in the layer direction (the directions indicated by arrows Z1 and Z2). That is, each of the through holes 46 of the layered portion 40 is formed such that a through hole 34b of the first facing portion 34, through holes 42a and 44a of the insulating plates 42 and 44, a through hole 12c of the held portion 19 of the fixed arm 12a, and a through hole 36b of the second facing portion 36 are coaxially arranged.

In the present embodiment, as shown in FIG. 2, three through holes 46 (461, 462, 463) are formed when viewed in the layer direction (directions of arrows Z1 and Z2) of the layered portion 40, and the two through holes 46 (461, 462) among them are arranged side by side at a distance in the front-rear direction (directions of the arrows X1 and X2). Of the two through holes 46 (461, 462) aligned in the front-rear direction, the through hole 46 (463) disposed on the front side (arrow X1 side) and the remaining third through hole 46 (461) are aligned in the up-down direction. Hereinafter, in a case where the through holes 461, 462, and 463 are not particularly distinguished from each other or the like, these are collectively and simply referred to as "through holes 46". The number and arrangement of the through holes 46 formed in the layered portion 40 are not particularly limited to those described above.

As shown in FIG. 3, each of the tightening mechanisms 27 includes a bolt 28, a nut 30, and a collar 32. The bolt 28 is, for example, a reamer bolt and includes a shaft portion 48 and a head portion 50. The shaft portion 48 of the bolt 28 is inserted into the through hole 46 of the layered portion 40. Here, it is preferable to provide an insulating portion 52 between an inner circumferential surface of the through hole 12*c* of the held portion 19 and an outer circumferential surface of the shaft portion 48 of the bolt 28, for electrically insulating from each other. The insulating portion 52 is formed in a cylindrical shape from an insulating material such as ceramics, for example, and is fitted into the through hole 12*c* of the held portion 19.

A projecting end portion 54 projecting from the layered portion 40 is provided on one end side of the shaft portion 48 of the bolt 28. The head portion 50 of the bolt 28 is provided on another end side of the shaft portion 48 of the bolt 28. An external thread 56 is formed on an outer periphery of the projecting end portion 54. The external thread 56 is not formed on the outer periphery of the shaft portion 48 of the bolt 28 except for the projecting end portion 54.

In the present embodiment, the shaft portion 48 of the bolt 28 is inserted into the through hole 46 of the layered portion 40 from a second facing portion 36 side toward a first facing portion 34 side. Therefore, the head portion 50 of the bolt 28 comes into contact with the periphery of the through hole 36*b* of the second facing portion 36 via a plain washer 58. In addition, the projecting end portion 54 of the shaft portion 48 projects to the outside (the arrow Z2 side) of the layered portion 40 via the through hole 34*b* of the first facing portion 34.

The nut 30 has an internal thread 60 which screw-engages the external thread 56 formed on the projecting end portion 54 of the shaft portion 48. By the screw-engagement between the external thread 56 and the internal thread 60, the nut 30 is attached to the projecting end portion 54 of the shaft portion 48. In addition, by relatively rotating the nut 30 and the bolt 28 in the direction in which the screw-engagement is advanced, the nut 30 can be brought close to the head portion 50 of the bolt 28 via the layered portion 40. On the other hand, the nut can be removed from the shaft portion 48 of the bolt 28 by relatively rotating the nut 30 and the bolt 28 in a direction of releasing the above-described screw-engagement.

The collar 32 has a hollow shape and is inserted into the through hole 34*b* of the first facing portion 34 so as to be movable in the layer direction of the layered portion 40 (the axial direction of the through hole 34*b*, or the directions of the arrows Z1 and Z2). The collar 32 is provided with an insertion hole 32*a* disposed coaxially with the axial direction of the through hole 34*b* of the first facing portion 34. In the present embodiment, the collar 32 has a cylindrical shape, but is not particularly limited thereto, and may have, for example, a C-shape or the like as viewed in the axial direction.

The diameter of the insertion hole 32*a* of the collar 32 is substantially the same as the diameter of the shaft portion 48 of the bolt 28, the inside diameter of the insulating portion 52, and the diameter of the through hole 36*b* of the second facing portion 36. The shaft portion 48 of the bolt 28 is inserted into the insertion hole 32*a*. The diameter of the through hole 34*b* of the first facing portion 34 is larger than the diameter of the through hole 36*b* of the second facing portion 36 by a radial thickness of the collar 32. The diameter of the through hole 12*c* of the held portion 19 is larger than the diameter of the through hole 36*b* of the second facing portion 36 by a radial thickness of the insulating portion 52.

The outer diameter of the collar 32 is substantially the same as the diameter of the through hole 34*b* of the first facing portion 34, and the collar 32 is fitted or lightly press-fitted into the through hole 34*b* of the first facing portion 34 so as to be movable in the axial direction thereof. Therefore, the collar 32 is prevented from moving (rattling or wobbling) in the radial direction inside the through hole 34*b* of the first facing portion 34.

A flange 62 is provided at an end portion of the collar 32 on a side (arrow Z1 side) across from the fixed arm 12*a*. The flange 62 is disposed between the inner side surface 34*a* of the first facing portion 34 and the fixed arm 12*a* (insulating plate 42). An outer diameter of the flange 62 is larger than an outer diameter of the collar 32 and the diameter of the through hole 34*b* of the first facing portion 34.

A length of the collar 32 in the axial direction is longer than a length of the through hole 34*b* of the first facing portion 34 in the axial direction. For this reason, an end portion of the collar 32 on the side opposite to the flange 62 in the axial direction projects to the outside (the arrow Z2 side) of the layered portion 40 via the through hole 34*b* of the first facing portion 34. In this case, when the nut 30 attached to the projecting end portion 54 of the shaft portion 48 of the bolt 28 is brought close to the head portion 50 of the bolt 28 as described above, the nut 30 can be brought into contact with the end portion of the collar 32 on the arrow Z2 side via a spring washer 64 and a plain washer 66.

When the external thread 56 and the internal thread 60 are further screw-engaged in a state where the nut 30 is brought into contact with the end portion of the collar 32 via the spring washer 64 and the plain washer 66, the collar 32 is pressed against the nut 30. That is, the tightening mechanism 27 tightens the second facing portion 36, the held portion 19 of the fixed arm 12*a*, and the collar 32 in the layer direction. As a result, the collar 32 moves in the through hole 34*b* of the first facing portion 34 in a direction approaching the fixed arm 12*a* (arrow Z1 direction).

Then, a contact surface 62*a* which is a surface of the flange 62 on the arrow Z1 side comes into contact with the held portion 19 of the fixed arm 12*a* with the insulating plate 42 interposed therebetween. The held portion 19 of the fixed arm 12*a* pressed in the direction of arrow Z1 through the contact with the contact surface 62*a*, comes into contact with the inner side surface 36*a* of the second facing portion 36 with the insulating plate 44 interposed therebetween. That is, by the tightening of the tightening mechanism 27, the held portion 19 of the fixed arm 12*a* is sandwiched and held between the contact surface 62*a* of the flange 62 and the inner side surface 36*a* of the second facing portion 36, and the held portion 19 is pressed toward the inner side surface 36*a* of the second facing portion 36.

At this time, a back surface 62*b* of the contact surface 62*a* of the flange 62 is separated from the inner side surface 34*a* of the first facing portion 34. That is, a distance between the inner side surfaces 34*a* and 36*a* of the first facing portion 34 and the second facing portion 36 is set to be larger than the total value of the thicknesses of the held portion 19 of the fixed arm 12*a*, the two insulating plates 42 and 44, and the flange 62.

In each of the three through holes 46 provided in the layered portion 40, the held portion 19 of the fixed arm 12a is sandwiched and held between the contact surface 62a of the flange 62 and the inner side surface 36a of the second facing portion 36. Thus, the fixed arm 12a is held by the fixed side holding portion 14a.

As shown in FIGS. 1 and 2, the holding portion main body 26 of the movable side holding portion 14b is formed of a member different from the mounting portion 16 and is fixed to the mounting portion 16 so as to be swingable. The movable side holding portion 14b holds the held portion 19 of the movable arm 12b instead of the held portion 19 of the fixed arm 12a. Except for these, the movable side holding portion 14b is basically configured in the same manner as the fixed side holding portion 14a. Therefore, a specific description of the movable side holding portion 14b in FIG. 4 will be omitted, with a description of the fixed side holding portion 14a in FIG. 3. Note that components of the movable side holding portion 14b in FIG. 4 corresponding to the components of the fixed side holding portion 14a in FIG. 3 (components having identical or similar functions and effects) are denoted by common reference numerals.

As shown in FIGS. 1 and 2, the mounting portion 16 includes a first mounting portion main body 67 and a second mounting portion main body (not shown). The first mounting portion main body 67 extends upward and rearward from the proximal end side of the first facing portion 34 (FIG. 3) of the fixed side holding portion 14a. The second mounting portion main body extends upward and rearward from the proximal end side of the second facing portion 36 (FIG. 3) of the fixed side holding portion 14a, similarly to the first mounting portion main body 67. The first mounting portion main body 67 and the second mounting portion main body face each other at a predetermined distance in the layer direction (the directions of arrows Z1 and Z2) of the layered portion 40. The holding portion main body 26 of the movable side holding portion 14b is fixed between the first mounting portion main body 67 and the second mounting portion main body so as to be swingable.

Specifically, in the first mounting portion main body 67 and the second mounting portion main body, a first guide groove 68a and a second guide groove 68b each extending in a predetermined direction are formed to penetrate in the directions of the arrows Z1 and Z2. Inside each of the first guide groove 68a and the second guide groove 68b, a fastener 70 for coupling the movable side holding portion 14b and the mounting portion 16 is provided. The fasteners 70 are movable along the extending directions of the first guide groove 68a and the second guide groove 68b.

Therefore, as described above, when the movable side holding portion 14b moves in accordance with the reciprocating movement of the rod in the swing unit 20, the fasteners 70 fixed to the movable side holding portion 14b move inside of the first guide groove 68a and the second guide groove 68b, respectively. Accordingly, the direction in which the movable side holding portion 14b moves relative to the mounting portion 16 (fixed side holding portion 14a) is guided. As a result, it is possible to swing the movable arm 12b in directions in which the resistance welding electrode 18a of the fixed arm 12a held by the fixed side holding portion 14a and the resistance welding electrode 18b of the movable arm 12b held by the movable side holding portion 14b are separated away from or brought closer to each other.

A shaft insertion hole 72 is formed on the rear end side of the first mounting portion main body 67 and the second mounting portion main body. An equalizing shaft 74 is inserted into the shaft insertion hole 72. The distal end arm of the above-mentioned robot is connected to the equalizing shaft 74, whereby the welding gun 10 is attached to the distal end arm of the robot.

Figure 5:
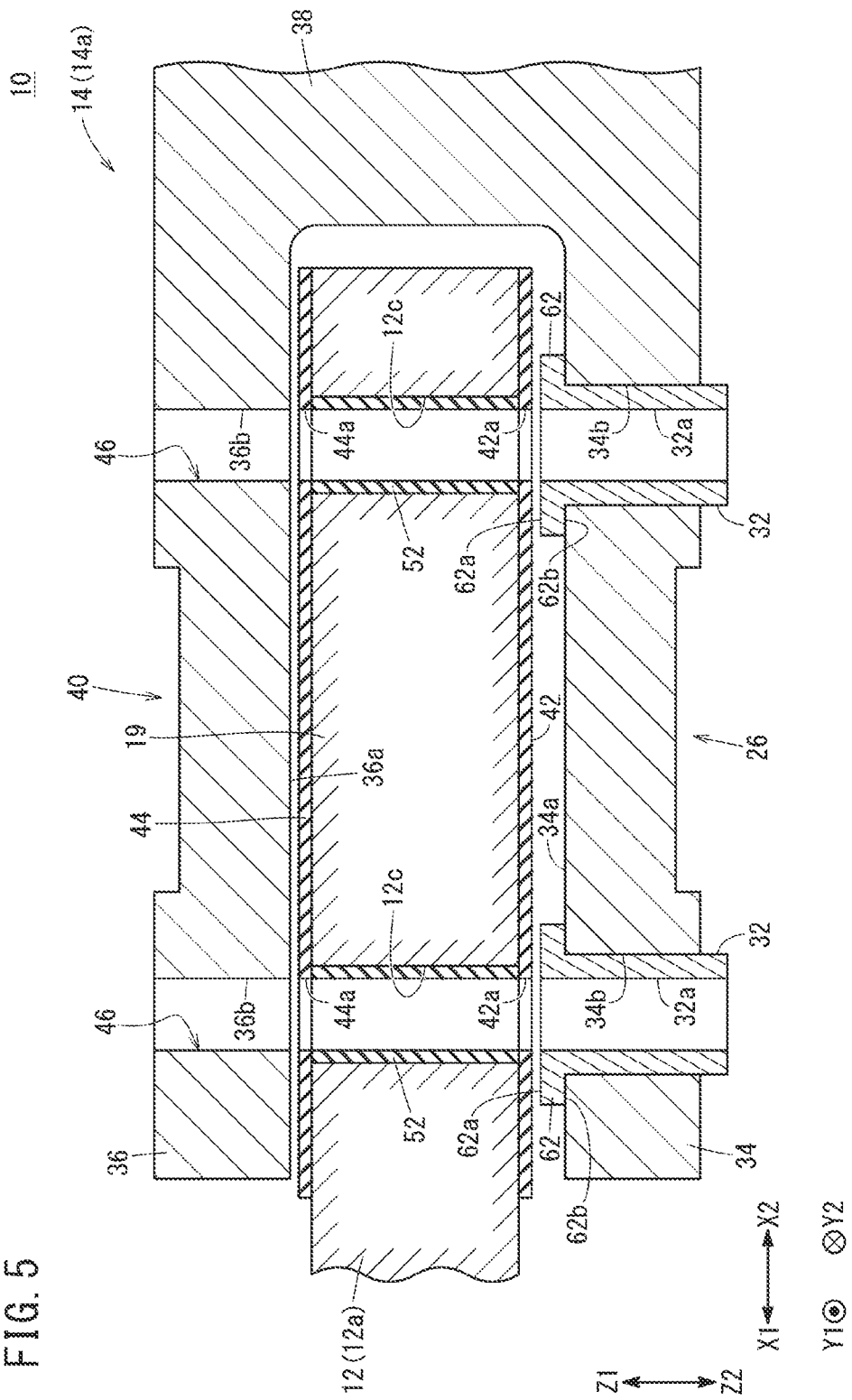
FIG. 5 is an explanatory view illustrating a state in which the layered portion is formed by interposing the held portion of the arm between a first facing portion and a second facing portion.

Concerning the welding gun 10 which is configured as described above, an example of a method of holding the held portion 19 of the fixed arm 12a on the fixed side holding portion 14a will be described below. First, as shown in FIG. 5, each of the collars 32 inserted into the through hole 34b of the first facing portion 34 is set at a position where the back surface 62b of the flange 62 comes into contact with the inner side surface 34a of the first facing portion 34. Thus, the distance between the contact surface 62a of the flange 62 and the inner side surface 36a of the second facing portion 36 can be increased as much as possible.

In this state, the held portion 19 of the fixed arm 12a and the insulating plates 42 and 44 are interposed between the contact surfaces 62a of the flanges 62 and the inner side surface 36a of the second facing portion 36 to form the layered portion 40. At this time, the through holes 34b of the first facing portion 34 (the insertion holes 32a of the collars 32), the through holes 36b of the second facing portion 36, the through holes 42a and 44a of the insulating plates 42 and 44, and the through holes 12c of the held portion 19 (the hole portions of the insulating portions 52) are arranged coaxially. Thus, each of the through holes 46 is formed in the layered portion 40 so as to integrally penetrate the layered portion 40.

Figure 6:
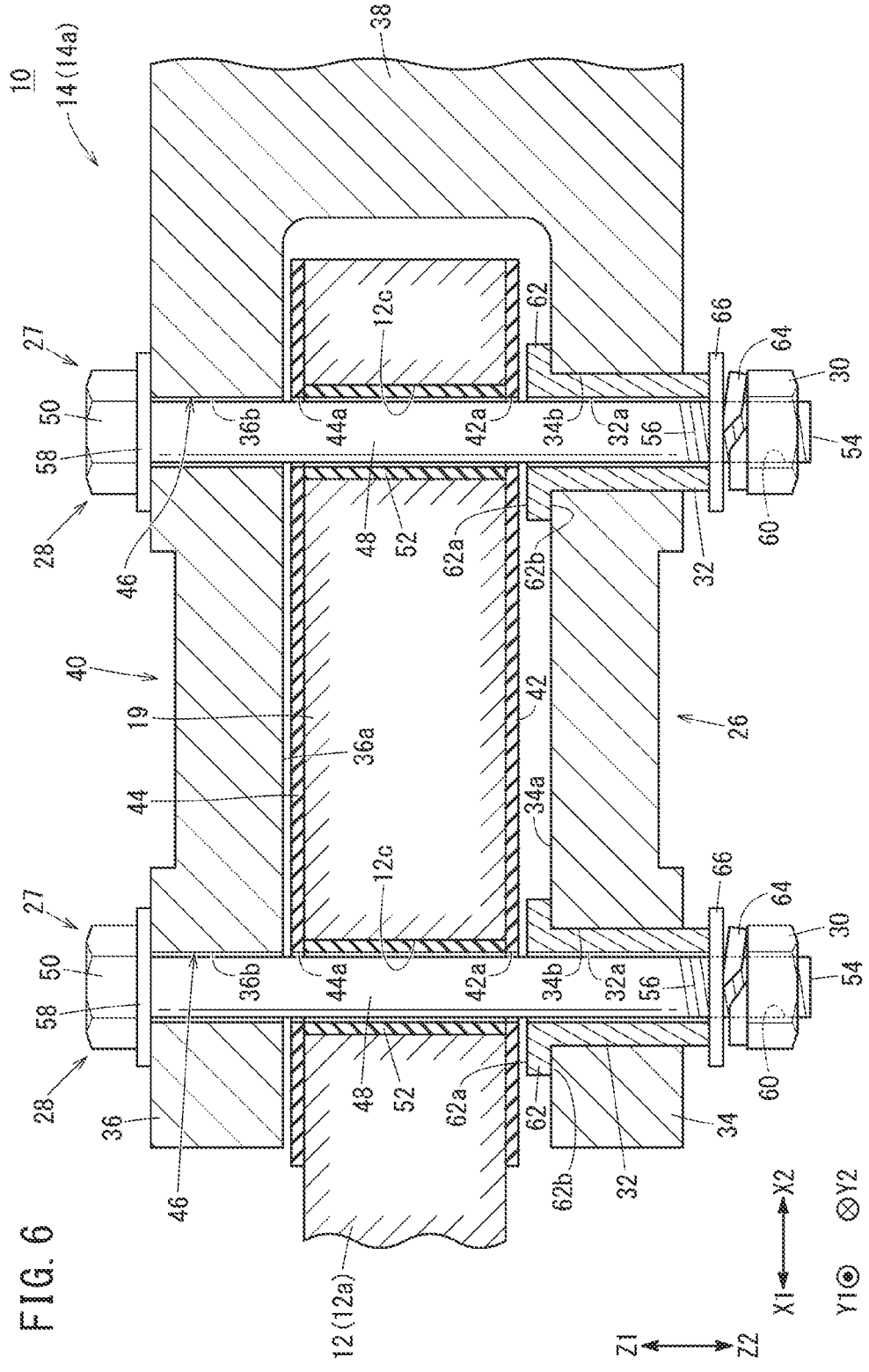
FIG. 6 is an explanatory view illustrating a state after shaft portions of bolts are inserted into through holes of a layered portion and before tightening by the tightening mechanisms is performed.

Next, as shown in FIG. 6, each of the shaft portions 48 of the bolts 28 is inserted through the through hole 46 of the layered portion 40 from the second facing portion 36 side toward the first facing portion 34 side, and the projecting end portion 54 of each of the shaft portions 48 is caused to project from the first facing portion 34 side to the outside of the layered portion 40. In addition, each of the head portions 50 of the bolts 28 is brought into contact with the periphery of the through hole 36b of the second facing portion 36 via the plain washer 58.

Next, the nut 30 is attached to the projecting end portion 54 of each of the bolts 28 via the plain washer 66 and the spring washer 64, and the bolt 28 and the nut 30 are relatively rotated to advance the screw-engagement between the external thread 56 and the internal thread 60. Accordingly, since the nut presses the end portion of the collar 32 via the plain washer 66 and the spring washer 64, the collar 32 moves in the axial direction in the through hole 34b of the first facing portion 34 and approaches the held portion 19 of the fixed arm 12a.

When the above-described screw-engagement is further advanced, as shown in FIG. 3, the contact surface 62a of each of the flanges 62 comes into contact with the held portion 19 of the fixed arm 12a with the insulating plate 42 interposed therebetween, and presses the held portion 19 toward the inner side surface 36a of the second facing portion 36 in the layer direction of the layered portion 40 (directions of arrows Z1, Z2). That is, by the tightening of each of the tightening mechanisms 27, the second facing portion 36, the held portion 19 of the fixed arm 12a, and the collars 32 are tightened in the layer direction. The above-described screw-engagement is advanced until the held portion 19 of the fixed arm 12a is sandwiched and held between the contact surfaces 62a of the flanges 62 and the inner side surface 36a of the second facing portion 36 with sufficient strength by the tightening of the tightening mechanisms 27. Thus, the held portion 19 of the fixed arm 12a is held by the fixed side holding portion 14a.

Figure 4:
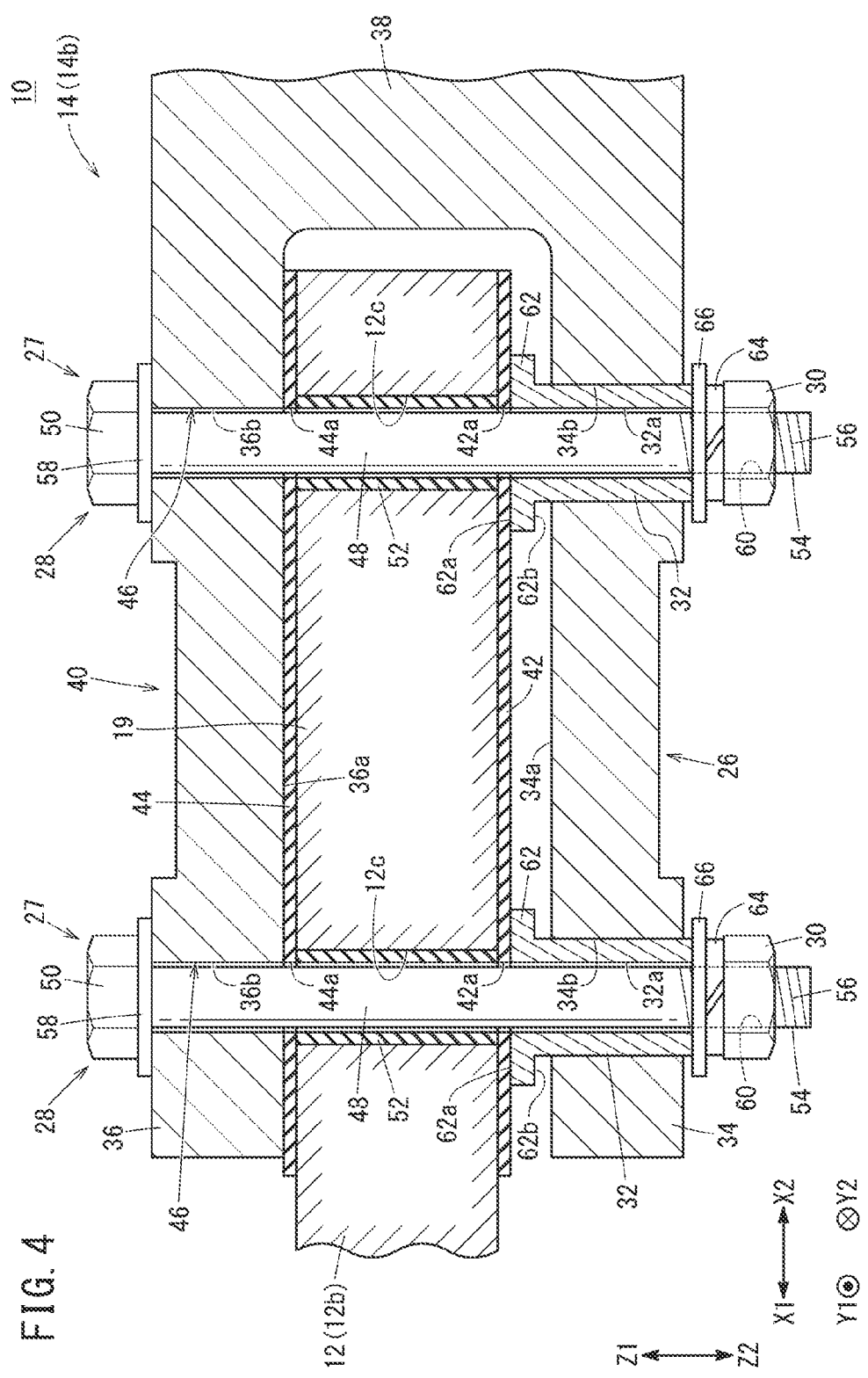
FIG. 4 is a cross-sectional view of the welding gun of FIG. 2 taken along line IV-IV.

As described above, the held portion 19 of the movable arm 12b can be held by the movable side holding portion 14b, in the same manner as the operation of holding the held portion 19 of the fixed arm 12a in the fixed side holding portion 14a. That is, as shown in FIG. 4, when the held portion 19 of the movable arm 12b is held by the movable side holding portion 14b, the second facing portion 36, the held portion 19 of the movable arm 12b, and the collars 32 are tightened in the layer direction by tightening of the tightening mechanisms 27. That is, the external thread 56 and the internal thread 60 are screw-engaged until the held portion 19 is sandwiched and held with sufficient strength between each of the contact surfaces 62a of the flanges 62 and the inner side surface 36a of the second facing portion 36.

As described above, the held portion 19 of the arm 12 held by the holding portion 14 can also be removed from the holding portion 14 by relatively rotating each of the nuts 30 and each of the bolts 28 in a direction in which the external thread 56 and the internal thread 60 are unscrewed. Therefore, for example, it is easy to remove the arm 12 from the holding portion 14 to perform maintenance of the arm 12 and the resistance welding electrodes 18a and 18b, or to replace the arm 12 in accordance with the type, shape, or the like of the workpiece W.

As described above, in the holding portion 14 of the welding gun 10 according to the present embodiment, the held portion 19 of the arm 12 is sandwiched and held between the collars 32 movable in the axial direction (the layer direction of the layered portion 40) in the through hole 34b of the first facing portion 34 and the inner side surface 36a of the second facing portion 36 by the tightening of the tightening mechanism 27. That is, the held portion 19 is pressed in the layer direction toward the inner side surface 36a of the second facing portion 36 via the collar 32. For this reason, the inner side surface 36a of the second facing portion 36 and the held portion 19 of the arm 12 can be brought into contact with each other substantially in parallel to each other so as to generate a satisfactory friction force therebetween. As a result, it is possible to increase the holding force of the held portion 19 by the holding portion 14.

In addition, even when the tightening is performed by the tightening mechanism 27 as described above, it is possible to prevent a force in a direction in which the first facing portion 34 and the second facing portion 36 approach each other from being applied to the first facing portion 34 and the second facing portion 36. For this reason, it is possible to suppress generation of stress between the connection portion 38 side of the first facing portion 34 and the second facing portion 36 and the other portions. As a result, the durability of the holding portion 14 can be improved. Therefore, according to the welding gun 10, the held portion 19 of the arm 12 can be firmly fixed by the holding portion 14, and the durability of the holding portion 14 can be improved. As a result, it is possible to suppress the positional displacement or the like of the resistance welding electrodes 18a and 18b with respect to the welding target portion of the workpiece W. Therefore, it is possible to improve the accuracy of the resistance welding performed by the welding gun 10.

In the embodiment described above, the shaft portion 48 of the bolt 28 is inserted through the through hole 46 of the layered portion 40 from the second facing portion 36 side toward the first facing portion 34 side. However, the shaft portion 48 may be inserted through the through hole 46 of the layered portion 40 from the first facing portion 34 side toward the second facing portion 36 side. That is, the projecting end portion 54 of the shaft portion 48 of the bolt 28 may project to the outside (the arrow Z1 side) of the layered portion 40 via the through hole 36b of the second facing portion 36.

In this case, when the nut 30 attached to the projecting end portion 54 of the shaft portion 48 of the bolt 28 is brought closer to the head portion 50 of the bolt 28 as described above, the head portion 50 of the bolt 28 can be brought into contact with the end portion of the collar 32 on the arrow Z2 side via the spring washer 64 and the plain washer 66. Even in this case, by bringing the head portion 50 of the bolt 28 and the nut 30 closer to each other with the layered portion 40 interposed therebetween, the held portion 19 of the arm 12 can be firmly fixed by the holding portion 14 in the same manner as described above, and the durability of the holding portion 14 can be improved.

In the welding gun 10 according to the above-described embodiment, the length of the collar 32 in the axial direction thereof is longer than the length of the through hole 34b of the first facing portion 34 in the axial direction thereof. In this case, as described above, the end portion of the collar 32 on the arrow Z2 side projects to the outside of the layered portion 40. Therefore, by relatively rotating the bolt 28 and the nut 30, the end portion of the collar 32 on the arrow Z2 side can be directly pressed, and the collar 32 can be moved with a simple configuration. In addition, by adjusting the axial length of the collar 32 and the relative position of the bolt 28 and the nut 30 by the screw-engagement of the external thread 56 and the internal thread 60, it is possible to easily adjust the pressing state of the held portion 19 of the arm 12 by the collar 32 (flange 62) and the inner side surface 36a of the second facing portion 36.

However, the axial length of the collar 32 may be shorter than the axial length of the through hole 34b of the first facing portion 34. In this case, for example, a tubular member (not illustrated) or the like formed of a member different from the collar 32 may be interposed between the nut 30 and the end portion of the collar 32 on the arrow Z2 side. That is, the held portion 19 of the arm 12 may be pressed against the inner side surface 36a of the second facing portion 36 via the tubular member and the collar 32.

In the welding gun 10 according to the above-described embodiment, the collar 32 is provided with the flange 62 at the end portion thereof on the side across from the held portion 19, and the flange 62 includes the contact surface 62a configured to press the held portion 19 when the held portion 19 is sandwiched and held between the second facing portion 36 and the collar 32. In this case, the held portion 19 of the arm 12 can be pressed against the inner side surface 36a of the second facing portion 36 via the contact surface 62a of the flange 62 having a larger area than the end surface of the collar 32. Therefore, the held portion 19 of the arm 12 can be more firmly fixed by the holding portion 14.

Further, as described above, by making the outer diameter of the flange 62 larger than the diameter of the through hole 34b of the first facing portion 34, the collar 32 is prevented from coming off in the direction of arrow Z2 with respect to the through hole 34b of the first facing portion 34. Thereby, it is also possible to facilitate handling of the holding portion 14.

In the welding gun 10 according to the above-described embodiment, when the contact surface 62a presses the held portion 19, the back surface 62b of the contact surface 62a of the flange 62 is separated from the inner side surface 34a of the first facing portion 34. In this case, as shown in FIG. 5, when the collar 32 is moved in the through hole 34b of the first facing portion 34 toward the arrow Z2 side to bring the back surface 62b of the flange 62 into contact with the inner surface 34a of the first facing portion 34, the distance between the contact surface 62a of the flange 62 and the inner side surface 36a of the second facing portion 36 can be made larger than the thickness of the arm 12. Therefore, it is possible to form the layered portion 40 by easily inserting the held portion 19 of the arm 12 between the contact surface 62a of the flange 62 and the inner side surface 36a of the second facing portion 36. In addition, it is possible to easily remove the arm 12 from between the contact surface 62a of the flange 62 and the inner side surface 36a of the second facing portion 36.

In the welding gun 10 according to the above-described embodiment, the insulating plates 42 and 44 are provided between the held portion 19 and the inner side surface 34a of the first facing portion 34 and between the held portion 19 and the inner side surface 36a of the second facing portion 36 in order to electrically insulate the held portion 19 from the inner side surfaces 34a and 36a of the first facing portion 34 and the second facing portion 36. In this case, when resistance welding is performed using the welding gun 10, the holding portion main body 26 and the arm 12 can be electrically insulated with a simple configuration.

The present invention is not limited to the embodiments described above, and various modifications can be made thereto without departing from the essence and gist of the present invention.

For example, in the welding gun 10 according to the above-described embodiment, both the fixed side holding portion 14a and the movable side holding portion 14b are configured to press the held portion 19 of the arm 12 against the inner side surface 36a of the second facing portion 36 via the collar 32. However, only at least one of the fixed side holding portion 14a or the movable side holding portion 14b may have the above-described configuration. In the welding gun 10 according to the above-described embodiment, only the movable side holding portion 14b is configured to be swingable with respect to the mounting portion 16 (fixed side holding portion 14a). However, the fixed side holding portion 14a may also be configured to be swingable with respect to the mounting portion 16.

REFERENCE SIGNS LIST 10 welding gun
12: arm
12c, 34b, 36b, 46: through hole
14: holding portion
18a, 18b: resistance welding electrode
19: held portion
27: tightening mechanism
28: bolt
30 nut
32: collar
32a: insertion hole
34: first facing portion
34a, 36a: inner side surface
36: second facing portion
38: connection portion
40 layered portion
42, 44: insulating plate
48: shaft portion
50 head portion 54: projecting end portion
56: external thread
60 internal thread
62: flange
62a: contact surface
62b: back surface

What is claimed is:

1. A welding gun comprising a holding portion configured to hold a held portion provided in an arm including a resistance welding electrode,
wherein the holding portion includes:
a first facing portion and a second facing portion configured to face each other with the held portion interposed therebetween to form a layered portion together with the held portion;
a connection portion configured to fix a relative position of the first facing portion and the second facing portion in order that a distance between inner side surfaces of the first facing portion and the second facing portion is equal to or greater than a thickness of the held portion, the inner side surfaces each being across from the held portion;
a through hole penetrating through the layered portion in a layer direction;
a hollow collar provided with an insertion hole, and configured to be inserted into the through hole of the first facing portion movably in the layer direction, the insertion hole being disposed coaxially with an axial direction of the through hole of the first facing portion;
a tightening mechanism inserted into the through hole of the second facing portion, the through hole of the held portion, and the insertion hole of the collar in order to tighten the second facing portion, the held portion, and the collar in the layer direction, and
wherein the held portion is sandwiched and held between the second facing portion and the collar by tightening of the tightening mechanism, and the held portion is pressed toward the inner side surface of the second facing portion, and
wherein the collar is provided with a flange at an end portion thereof on a side across from the held portion, and
the flange includes a contact surface configured to press the held portion when the held portion is sandwiched and held between the second facing portion and the collar.

2. The welding gun according to claim 1, wherein a length of the collar in an axial direction thereof is longer than a length of the through hole of the first facing portion in the axial direction of the through hole.

3. The welding gun according to claim 1, wherein when the contact surface presses the held portion, a back surface of the contact surface of the flange is separated from the inner side surface of the first facing portion.

4. The welding gun according to claim 1, wherein insulating plates are provided between the held portion and the inner side surface of the first facing portion and between the held portion and the inner side surface of the second facing portion, in order to electrically insulate the held portion from the inner side surfaces of the first facing portion and the second facing portion.

* * * * *